(12) United States Patent
Chen et al.

(10) Patent No.: US 7,001,499 B2
(45) Date of Patent: Feb. 21, 2006

(54) METHOD FOR ELECTROPLATING A BODY-CENTERED CUBIC NICKEL-IRON ALLOY THIN FILM WITH A HIGH SATURATION FLUX DENSITY

(75) Inventors: Mike Ming Yu Chen, Daly City, CA (US); Thomas Edward Dinan, San Jose, CA (US); April Hixson-Goldsmith, Campbell, CA (US); Murali Ramasubramanian, San Jose, CA (US); Neil Leslie Robertson, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 477 days.

(21) Appl. No.: 10/053,785

(22) Filed: Jan. 18, 2002

(65) Prior Publication Data

US 2003/0136683 A1 Jul. 24, 2003

(51) Int. Cl.
*C25D 5/50* (2006.01)
(52) U.S. Cl. .................. 205/224; 205/227; 205/255; 148/518; 148/529
(58) Field of Classification Search ............... 205/224, 205/227, 255; 148/108, 121, 518, 529
See application file for complete search history.

(56) References Cited

U.S. PATENT DOCUMENTS

| | | | |
|---|---|---|---|
| 4,589,042 A | 5/1986 | Anderson et al. | 360/125 |
| 4,661,216 A | 4/1987 | Anderson et al. | 204/44.5 |
| 4,756,816 A | 7/1988 | Liao et al. | 204/44.5 |
| 5,763,108 A | 6/1998 | Chang et al. | 428/694 |
| 5,812,350 A | 9/1998 | Chen et al. | 360/126 |
| 5,864,450 A | 1/1999 | Chen et al. | 360/113 |
| 6,118,628 A | 9/2000 | Sano et al. | 360/126 |

*Primary Examiner*—Robert R. Koehler
(74) *Attorney, Agent, or Firm*—Lewis L. Nunnelley; Ron Feece

(57) ABSTRACT

A process for electroplating and annealing thin-films of nickel-iron alloys having from 63% to 81% iron content by weight to produce pole pieces having saturation flux density ($B_S$) in the range from 1.9 to 2.3 T (19 to 23 kG) with acceptable magnetic anisotropy and magnetostriction and a coercivity ($H_C$) no higher than 160 A/m (2 Oe). The desired alloy layer properties, including small crystal size and minimal impurity inclusions, can be produced by including higher relative levels of $Fe^{++}$ ions in the electroplating bath while holding the bath at a lower temperature while plating from a suitable seed layer. The resulting alloy layer adopts a small crystal size (BCC) without significant inclusion of impurities, which advantageously permits annealing to an acceptable $H_C$ while retaining the high $B_S$ desired.

14 Claims, 2 Drawing Sheets

METHOD FOR ELECTROPLATING A BODY-CENTERED CUBIC NICKEL-IRON ALLOY THIN FILM WITH A HIGH SATURATION FLUX DENSITY

BACKGROUND OF THE INVENTION

1. Field of the Invention

This invention relates generally to ferromagnetic alloy thin-films and more particularly to alloy films with high saturation flux densities for magnetic write heads.

2. Description of the Related Art

The terminology and units used in the magnetic materials arts vary from one region to another. Accordingly, a brief summary of terminology used herein is presented for clarity. Magnetic Flux is expressed in *Système International d'unités* (SI) units of webers (Wb) or volt-seconds, each of which is exactly equivalent to 100,000,000 maxwells (Mx). Magnetic Flux Density (B) is expressed in SI units of teslas (T), each of which is exactly equivalent to 10,000 gauss (G). Magnetic Field Intensity (H) is expressed in SI units of amperes per meter (A/m), each of which is approximately equivalent to about 0.0126 oersteds (Oe). As used herein, the Permanent Magnetic Moment or Magnetization ($B_M$) of a material is the magnetic flux density (B) in teslas present in the material with no external magnetic H-field applied. The Saturation Flux Density ($B_S$) of a material (commonly denominated $4\pi M_S$) is the maximum magnetic flux density (B) in teslas that can be induced in the material by a large external magnetic field (H-field). The Remanence or Retentivity ($B_R < B_S$) of a material is the magnetic moment in teslas remaining in the material after forcing the material into saturation along the easy axis and then removing the external H-field. The Coercivity ($H_C$) of a material is the magnetic field (H-field) intensity in amperes per meter required to overcome the remanence moment ($B_R$) to reduce the magnetic flux density (B) in the material to zero along the easy axis. The Anisotropic Field ($H_K > H_C$) of a material (also may be denominated "the magnetic anisotropy") is the magnetic field (H-field) intensity in amperes per meter required to induce the saturation flux density ($B_S$) in the material along the hard axis normal to the easy axis. The permeability of a material ($\mu$) is defined as the ratio B/H with appropriate units and may be shown to be about the same as $B_S/H_K$ when large. The permeability of free space is defined such that a magnetic field intensity (H) of one oersted produces a magnetic flux density (B) of one gauss. Accordingly, a large external H-field may be applied to force a material into saturation along the easy axis and induce therein the maximum magnetic flux density ($B_S$) possible for the material. Removing the external H-field leaves a permanent remanence moment ($B_R$) in the material oriented along the easy axis. A reverse external H-field equal to the material coercivity ($H_C$) may then be applied along the easy axis to reduce the magnetic flux density (B) in the material to zero.

The thin-film inductive head and the inductive/magnetoresistive (MR) head are well-known in the art. Both of these heads can write and read signals with respect to a magnetic medium such as a rotating disk medium or a streaming tape medium. The inductive head usually includes first and second poles having first and second ferromagnetic (FM) pole tips, respectively. The pole tips are separated by a gap at an air bearing surface (ABS) or head surface. A coil is disposed between the first and second poles to couple magnetically thereto. The MR head uses an inductive write head portion to perform write functions and a MR read head portion to perform read functions. The read head portion includes an MR sensor sandwiched between a pair of read gap layers, which are in turn sandwiched between first and second shield layers. Either type of magnetic head is usually mounted on or embedded in a slider that is supported in a transducing relationship with respect to a magnetic medium. The magnetic medium may be either a magnetic disk or a magnetic tape.

The pole pieces, including the pole tips, are commonly constructed of Permalloy ($Ni_{81}Fe_{19}$), which combines 81% nickel with 19% iron by weight. Permalloy is a desirable material for pole-construction, having good soft magnetic properties (low coercivity and high saturation flux density) and being easy to shape by normal patterning and deposition techniques. Further, Permalloy has good corrosion resistance for head reliability. Permalloy has a saturation flux density ($B_S$) of about 1.0 T (10 kG) and a coercivity ($H_C$) of no more than 20 A/m (0.2 Oe) at worst. But it is desirable to increase the saturation flux density ($B_S$) well above this value so that the pole tips can carry the larger magnetic flux density required to overcome the high coercivity of modern high-density magnetic data storage media.

Cobalt-based magnetic alloys have a higher saturation flux density ($B_S$) than does Permalloy. However, cobalt materials have significantly worse corrosion resistance. Another family of high-$B_S$ materials is the sputtered FeNiX materials, where X is from the group of tantalum, aluminum, and rhodium. But sputter-deposition of the pole pieces is not as desirable as frame-plating because ion-milling is required after sputtering to shape the trackwidth of the pole tips. This process is very difficult to implement. And sputtered materials exhibit a high stress that can distort recorded signals. Moreover, magnetically forming a thick film of such materials using sputtering is difficult because the sputtered material has a large magnetocrystalline anisotropy and the crystal grain size of the sputtered film becomes large so the anisotropic field ($H_K$) is disadvantageously large. An electroplating method is preferred to suppress the crystal grain size to a small value to reduce the anisotropic field ($H_K$) while retaining the desired high saturation flux density ($B_S$); this effectively increases the permeability ($\mu \approx B_S/H_K$) of the thin-film material.

For example, the commonly-assigned U.S. Pat. No. 4,661, 216 discloses an electroplating bath composition useful for fabricating thin-film layers of magnetic cobalt-nickel-iron alloys with high percentages of cobalt. With the disclosed method, pole-piece layers may be fabricated with saturation flux densities ($B_S$) of over 1.4 T (14 kG) while coercivity ($H_C$) is less than 160 A/m (2 Oe). However, these values are not sufficient to fully exploit the capacity of modern high-density data storage media.

Considerable more recent effort has been undertaken by practitioners in the art to increase the recording density of magnetic heads. Decreasing the length (i.e., the thickness) of the gap between the first and second pole tips permits writing of more bits per inch of media. Further, increasing the coercivity ($H_C$) of the magnetic medium allows the medium to accurately retain data with a higher areal bit density with less thermal degradation. A consequence of such higher bit density is a higher data transfer rate for information between the head and the medium. These magnetic media coercivity and density improvements require the magnetic pole materials to conduct relatively high magnetic flux densities, especially those portions of the poles (the pole tips) adjacent to the gap at the ABS. However, the ferromagnetic (FM) pole materials have a saturation flux density ($B_S$) limit beyond which they can conduct no more magnetic flux. Accordingly, there is still a clearly-felt need for a pole tip structure having a high saturation flux density ($B_S$) to operate effectively with newer high-coercivity magnetic media.

For example, the U.S. Pat. No. 5,763,108 discloses an electroplating method for forming thin films of a nickel-iron alloy having (preferably) from 54% to 56% of iron by weight alloyed with less than 0.5% tin by weight. Bath temperature is maintained above 20° C. to about 35° C. and includes from about 0.4 to about 0.9 moles per liter of iron ($Fe^{++}$) ions. Annealing is accomplished at from 120° C. to 300° C. A disclosed process for simultaneously thermally annealing and anisotropically magnetically aligning the pole-piece layers results in a saturation flux density ($B_S$) of as high as 1.6 T (16 kG), a coercivity ($H_C$) of less than 80 A/m (1 Oe) and an anisotropic field ($H_K$) of 650 to 1300 A/m (8 to 16 Oe). However, these values are not sufficient to fully exploit the capacity of modern high-density data storage media.

As another example, the U.S. Pat. No. 6,118,628 describes an electroplating method for fabricating thin films using a nickel-iron alloy having up to 62% iron by weight and adding less than 15% cobalt or less than 3% of molybdenum, chromium, boron, indium, palladium or the like. Electroplating bath temperature is maintained above 20° C. to about 35° C. and the nickel-to-iron ion ratio ($Ni^{++}/Fe^{++}$) is maintained between 7 and 8. Annealing is accomplished at from 120° C. to 300° C. Saturation flux densities from 1.3 to 1.65 T (13 to 16.5 kG) were obtained while limiting coercivity to less than 80 A/m (1 Oe by electroplating a pole layer through a mask using one of these third elements in a nickel-iron alloy with about 55% iron by weight. However, these values are not sufficient to fully exploit the capacity of modem high-density data storage media.

The pole material of choice in the art is currently a nickel-iron alloy with from 50% to 60% iron by weight (often denominated $Ni_{45}Fe_{55}$), the properties of which have not yet been substantially improved by the addition of minor portions of other elements. But the saturation flux density of this material is limited to about 1.75 T (17.5 kG) at best, even with other trace elements, perhaps because of inclusions of oxides and other unwanted impurities during the electroplating processes known in the art. It would be desirable to improve the saturation flux density ($B_S$) of this nickel-iron alloy by adding more iron to provide more than 62% iron by weight but the art generally teaches away from this proposal because FM alloys with higher iron concentrations are expected to have a coercivity ($H_C$) of over 250 A/m (over 3 Oe), which is too high to handle the high frequencies required to write high-density data to a high-coercivity medium. So a useful method for creating nickel-iron alloy thin films exhibiting high saturation magnetization and low coercivity is very desirable but, until now, has been unknown in the art. The related unresolved problems and deficiencies are clearly felt in the art and are solved by this invention in the manner described below.

SUMMARY OF THE INVENTION

This invention solves the above problems by introducing a method for electroplating and annealing thin-films of nickel-iron alloys having from about 63% to about 81% iron content by weight. The electroplating method of this invention for the first time permits the formation of nickel-iron pole pieces having saturation flux density ($B_S$) in the range from about 1.9 to 2.3 T (19 to 23 kG) with acceptable magnetic anisotropy and magnetostriction and a coercivity ($H_C$) no higher than 160 A/m (2 Oe). The method of this invention arises from the unexpectedly advantageous observation that the necessary alloy layer properties, including small crystal size and minimal impurity inclusions, can be produced by including higher relative levels of $Fe^{++}$ ions in the electroplating bath while holding the bath at a lower temperature while plating from a suitable seed layer. The resulting alloy layer adopts a small crystal size (BCC) without significant inclusion of impurities, which advantageously permits annealing to an acceptable $H_C$ while retaining the high $B_S$ desired.

It is a purpose of this invention to provide a method for the formation of pole pieces having saturation flux density ($B_S$) in the range from about 1.9 to 2.3 T (19 to 23 kG) with acceptable magnetic anisotropy and magnetostriction properties and with a coercivity ($H_C$) no higher than 160 A/m (2 Oe).

The process of this invention involves electroplating a nickel-iron film on a seed layer using an electroplating bath containing a $Ni^{++}$ ionic molarity of about 0.30 to 0.475 moles/liter and a $Fe^{++}$ ionic molarity of about 0.065 to 0.165 moles/liter, the ratio of the $Ni^{++}$ ions and the $Fe^{++}$ ions ($Ni^{++}/Fe^{++}$) being maintained between about 4 to less than 7, and containing a stress release agent and a surface active agent, the pH being maintained between about 2.7 and 3.5. It is preferable for the thin film to be formed by electroplating onto a seed layer while keeping the plating bath temperature below 20° C. with a current density of about 50 to 150 $A/m^2$.

In one aspect, he invention is a method of forming a thin magnetic film of nickel-iron alloy including from about 63% to about 81% iron by weight, including the steps of preparing a substrate surface, preparing an aqueous plating solution having more than four and less than seven $Ni^{++}$ ions for each $Fe^{++}$ ion, maintaining the temperature of the aqueous solution below 20° C., passing from the substrate surface a current through the aqueous plating solution to an anode to form an electroplated layer on the substrate surface, and annealing the electroplated layer in the presence of an external magnetic field $H_{EXT}$.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENT

Figure 1:
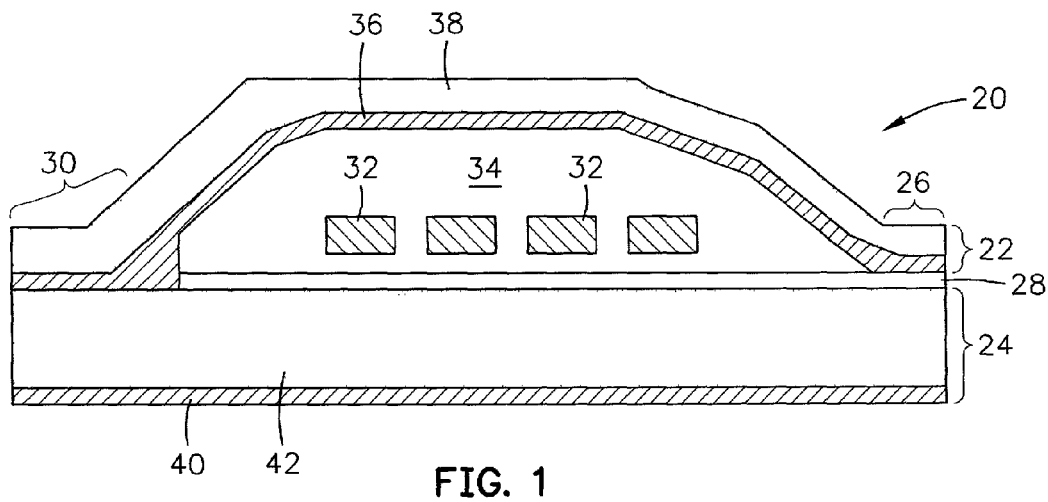
FIG. 1 is a schematic diagram of the pole structures of an exemplary magnetic write head having the pole tip characteristics fabricated using the electroplating method of this invention.

FIG. 1 is a schematic diagram of the pole structures of an exemplary thin-film magnetic head embodiment 20 showing the upper pole piece 22 and the lower pole piece 24 separated at the pole-tip region 26 by a pole-tip gap layer 28. Upper and lower pole pieces 22–24 each include a pole tip in pole-tip region 26 and are joined to one another in the yoke region 30 to complete the magnetic pole flux circuit in the well-known manner. A series of magnetic coil windings exemplified by the coil winding 32 are shown in cross-section separated from upper pole piece 22 and pole-tip gap layer 28 by an insulating structure 34 composed of several intermediate layers (not shown) of nonconducting nonmagnetic material. A writing current (not shown) in coil winding 32 is coupled to the magnetic flux in upper and lower pole layers 22–24 in the usual manner through yoke connection 30. Upper pole piece 22 includes a seed layer 36 and an electroplated layer 38. Upper pole piece 24 includes a seed layer 40 and an electroplated layer 42. Electroplated layers 38 and 42 are formed according to the method of this invention for making a nickel-iron alloy having a body-centered cubic (BCC) structure with from about 64% to about 81% iron by weight.

The method of this invention forms electroplated layers 38 and 42 so that the alloy has a small domain size and therefore a relatively low anisotropic field ($H_K$) with a very high saturation flux density ($B_S$) of from about 1.9 to about 2.3 T (19 to 23 kG). Seed layers 36 and 40 are preferably formed of an alloy having an equal or higher saturation flux density ($B_S$) value. For example, seed layers 36 and 40 may be formed of a sputtered nickel-iron alloy with 64% to 81% iron by weight. Or, as other examples, seed layers 36 and 40 may be formed of a sputtered iron-nitride-X (FeNX) alloy, or a cobalt-iron-X (CoFeX) alloy with X comprising nickel, nitrogen, aluminum, rhodium, tantalum or other suitable element, as long as the seed layer saturation flux density ($B_S$) value is no less than the about 1.9 to about 2.3 T (19 to 23 kG) value of electroplated layers 38 and 42. Seed layers 36 and 40 may be deposited by sputtering, ion beam deposition or vacuum deposition (evaporation). Head 20 is described in the formally commonly-assigned U.S. patent application Ser. No. 10/054,554 filed on even date herewith, entitled "A High-Saturation Thin-film Write Head for High-Coercivity Magnetic Data Storage Media," which is entirely incorporated herein by this reference. Upper and lower pole layers 22–24 can transmit magnetic flux levels of over 2 T (20 kG) at high frequencies without saturating because of the relatively low coercivity ($H_C$). Thus, write head 20 is suitable for writing magnetic data onto high-coercivity magnetic storage media at high frequencies required to support the increased areal data storage densities demanded today.

Figure 2:
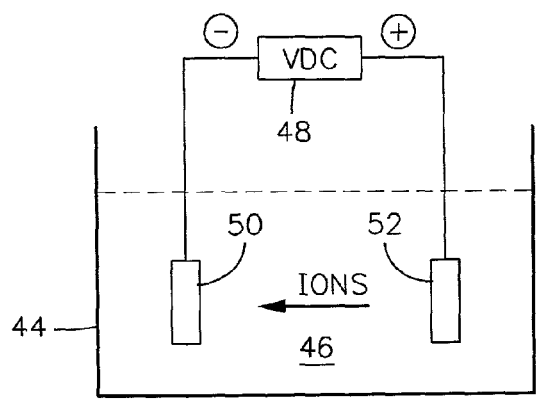
FIG. 2 is a schematic diagram illustrating the electroplating method of this invention.

FIG. 2 is a schematic diagram illustrating a physical apparatus for performing the electroplating method of this invention. An electroplating tank 44 holds the aqueous electroplating solution 46 of this invention, which is maintained at a controlled temperature below 20° C. by any useful means known in the art (not shown). A pulsed or continuous direct-current (DC) voltage source 48 is electrically coupled to a seeded substrate 50 and an anode 52 substantially as shown. DC voltage source 48 provides a controlled electroplating current of positive ions from anode 52 to substrate 50 in the usual manner. Because aqueous electroplating solution 46 contains nickel and iron ions in a controlled concentration and ratio, a layer of nickel-iron alloy is slowly deposited onto the surface of seeded substrate 50 as long as the electroplating current is flowing.

Figure 3:
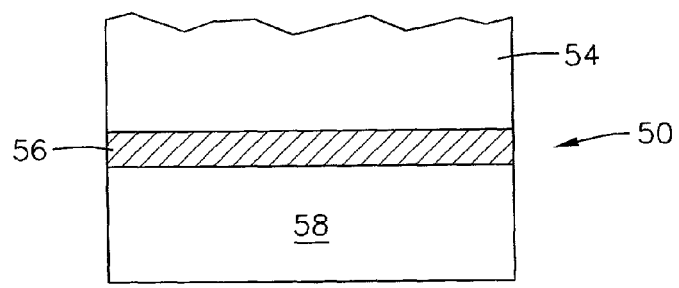
FIG. 3 is a schematic diagram of the nickel-iron alloy layer fabricated according to the method of this invention.

FIG. 3 is a schematic diagram of a portion of the exposed surface of seeded substrate 50 in more detail, showing the nickel-iron alloy layer 54 electroplated according to the method of this invention and the seed layer 56 that is deposited onto a substrate 58. Substrate 58 may be a non-metallic nonmagnetic material, such as silicon or silicon-dioxide. Seed layer 56 is preferably formed of a FM alloy having a saturation flux density ($B_S$) value of at least 1.9 to 2.3 T (19 to 23 kG). For example, seed layers 56 may be formed of a sputtered nickel-iron alloy with 64% to 81% iron by weight or, as other examples, may be formed of a sputtered iron-nitride-X (FeNX) alloy, or a cobalt-iron-X (CoFeX) alloy with X selected from a group including nickel, nitrogen, aluminum, rhodium, tantalum or other suitable element.

Figure 4:
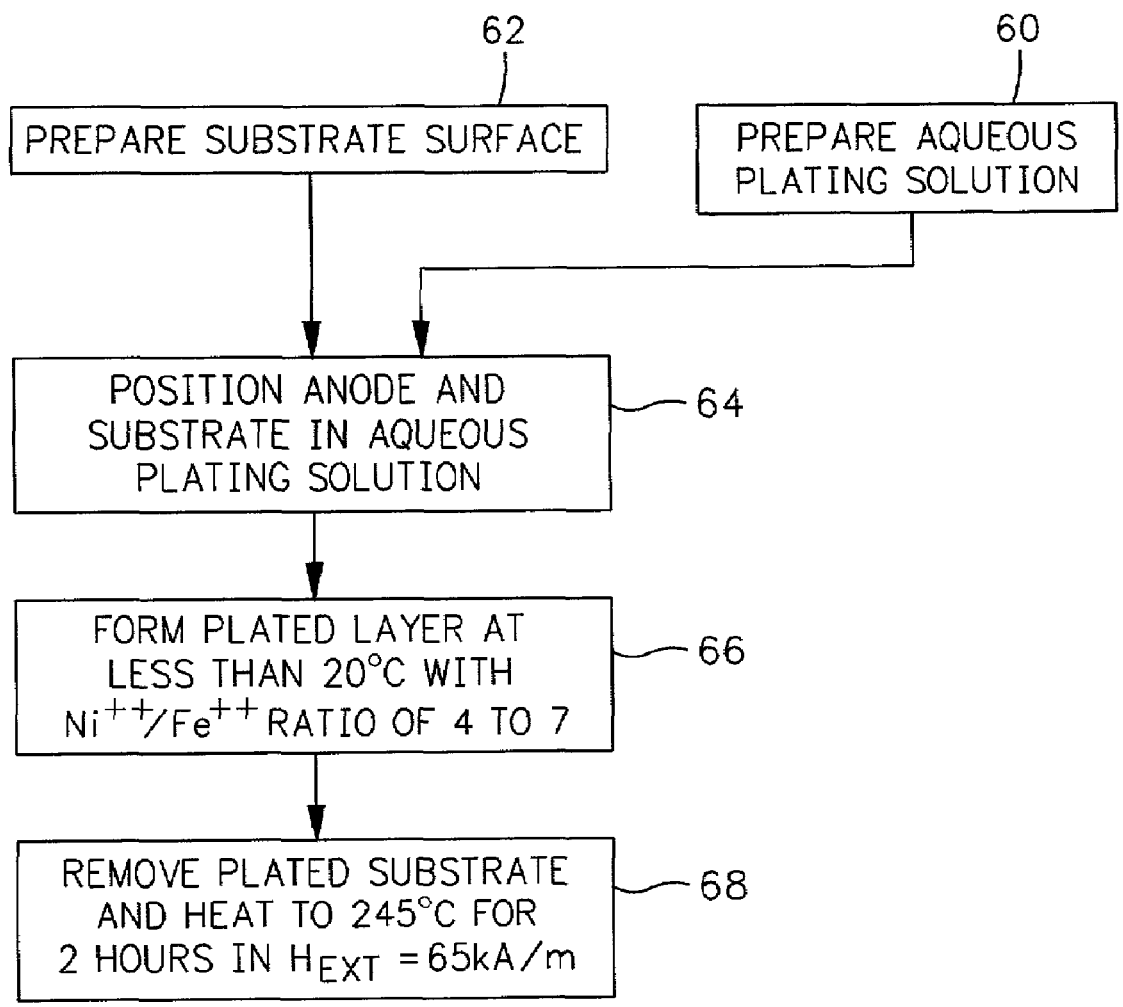
FIG. 4 is a block diagram of a flow chart illustrating the electroplating method of this invention.

FIG. 4 is a block diagram of a flow chart illustrating the electroplating method of this invention. In the first step 60, the electroplating solution 46 (FIG. 2) is prepared by dissolving a controlled amount of each of a number of compounds in water such that the ionic ratio of nickel to iron is held between 4 and 7. In step 62, the substrate is prepared for electroplating by adding seed layer 56 (FIG. 3) to the surface of substrate 58 layer by sputtering, ion beam deposition or vacuum deposition (evaporation), to form seeded substrate 50 (FIG. 2). In the next step 64, anode 52 and seeded substrate 50 are electrically coupled to DC voltage source 48 and positioned in electroplating tank 44 (FIG. 2). In the step 66, a controlled electroplating current is passed through aqueous electroplating solution 46 for a predetermined time period while the solution temperature is held below 20° C. As may be readily appreciated, the deposition rate increases as electroplating current is increased, but the deposition rate should be held to that which can be achieved with the specified current density range to avoid possible degradation of the magnetic properties of the resulting thin film.

After plating, in the final step 68, the plated substrate is heated to about 245 degrees Celsius in an external magnetic field of about 64 kA/m (800 Oe) aligned with the electroplated layer easy axis and annealed for two hours. This annealing step 68 is critical to the success of the method of this invention because it is required to reduce the coercivity ($H_C$) of electroplated layer 54 from the usual 240 A/m (3 Oe) to as low as 80 A/m (1 Oe) and to increase the magnetic moment in the material to the desired level.

As indicated hereinbefore and shown in the exemplary table below, the nickel and iron are introduced as soluble salts. The boric acid is used as a pH buffer to maintain a relatively constant pH in the bath. The sodium saccharin acts as a stress relieving agent. Finally, the F-95 surfactant (available from 3M Company, St. Paul, Minn.) is used to eliminate pitting. The sulfate constituents in the bath provides a solution having low toxicity. The relatively low amount of nickel as compared with iron in the solution yields the nickel-iron alloy having about 63% to 81% iron content by weight and having a saturation moment of 1.9 to about 2.3 T (19 to 23 kG).

The following example illustrate the practice of this invention, however the invention is limited only by the following claims and is not limited to the specific values in the example or specification.

EXAMPLE

The electroplating bath includes several compounds dissolved in water in the concentrations shown in the following table:

| Compound | Symbol | Concentration (g/l) |
| --- | --- | --- |
| Ferrous sulfate heptahydrate | $FeSO_4 \cdot 7H_2O$ | 10–25 |
| Nickel sulfate hexahydrate | $NiSO_4 \cdot 6H_2O$ | 10–20 |
| Nickel chloride hexahydrate | $NiCl_2 \cdot 6H_2O$ | 30–45 |
| Sodium chloride | NaCl | 20–30 |
| Boric Acid | $H_3BO_3$ | 20–30 |
| Sodium saccharin | $C_7H_4NNaO_3$ | 2.1–3.0 |
| FC-95 surfactant (3M) | | 0.005–0.050 |

The conditions maintained during the electroplating process include those specified in the following table:

| Parameter | Value | Units |
| --- | --- | --- |
| Current Density | 50–150 | $A/m^2$ |
| Bath Temperature | 15–20 | ° C. |
| Paddle Agitation | 0.5–2.0 | Hz |
| Flow Rate | 1–3 | gpm |
| PH | 2.7–3.5 | |
| $Ni^{++}/Fe^{++}$ ratio | 4.0–7.0 | |

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A method of forming a thin magnetic film of nickel-iron alloy including from 63% to 81% iron by weight, the thin magnetic film also having a coercivity $H_C$ and a saturation flux density $B_S$, the method comprising the steps of:
    (a) preparing a substrate surface;
    (b) preparing an aqueous plating solution having more than four and less than seven $Ni^{++}$ ions for each $Fe^{++}$ ion;
    (c) maintaining the temperature of the aqueous solution below 20° C.;
    (c) passing from the substrate surface a current through the aqueous plating solution to an anode to form an electroplated layer on the substrate surface; and
    (d) annealing the electroplated layer in the presence of an external magnetic field $H_{EXT}$.

2. The method of claim 1 wherein the preparing step (a) comprises the step of:
    (a.1) forming a ferromagnetic seed layer on the substrate surface.

3. The method of claim 2 wherein the ferromagnetic seed layer comprises a material selected from a group consisting of:
    a nickel-iron (NiFe) alloy, an iron-nitride-X (FeNX) alloy and a cobalt-iron-X (CoFeX) alloy wherein X comprises a material selected from a group comprising nickel, nitrogen, aluminum, rhodium and tantalum.

4. The method of claim 3 wherein the ferromagnetic seed layer consists substantially of a nickel-iron alloy containing from 64% to 81% iron by weight.

5. The method of claim 2 wherein the ferromagnetic seed layer is formed by a process selected from a group including: sputtering, ion beam deposition, and vacuum deposition.

6. The method of claim 5 wherein the anneal step (d) comprises the steps of:
    (d. 1) heating the electroplated layer to a temperature of from 225° C. to 275° C.; and
    (d.2) setting the external magnetic field intensity, $H_{EXT}$, to 64 kA/m oriented along the easy axis of the electroplated layer.

7. The method of claim 2 wherein the aqueous plating solution includes from 0.06 moles/liter to 0.17 moles/liter of $Fe^{++}$ ions.

8. The method of claim 2 wherein the passing step (c) comprises the step of:
    passing in from the substrate surface a current of from about 50 $A/m^2$ to 150 $A/m^2$ through the aqueous plating solution to an anode.

9. The method of claim 1 wherein the preparing step (b) comprises the steps of:
    (b.1) dissolving from about 10 to about 25 g/l ferrous sulfate heptahydrate in the aqueous plating solution;
    (b.2) dissolving from about 10 to about 25 g/l nickel sulfate hexahydrate in the aqueous plating solution; and
    (b.3) dissolving from about 30 to about 45 g/l nickel chloride hexahydrate in the aqueous plating solution.

10. The method of claim 9 wherein the annealing step (d) comprises the steps of:
    (d.1) heating the electroplated layer to a temperature of from about 225° C. to 275° C. for no less than about 2 hours; and
    (d.2) setting the external magnetic field intensity $H_{EXT}$ to about 64 kA/m oriented along the easy axis of the electroplated layer.

11. The method of claim 1 wherein the annealing step (d) comprises the steps of:
    (d. 1) heating the electroplated layer to a temperature of from about 225° C. to 275° C. for no less than 2 hours; and
    (d.2) setting the external magnetic field intensity $H_{EXT}$ to 64 kA/m oriented along the easy axis of the electroplated layer.

12. The method of claim 1 wherein the coercivity $H_C$ is less than about 160 A/m and the saturation flux density $B_S$ is more than 1.9 teslas.

13. The method of claim 1 wherein the aqueous plating solution includes from 0.06 moles/liter to 0.17 moles/liter of $Fe^{++}$ ions.

14. The method of claim 1 wherein the passing step (c) comprises the step of:
    passing in from the substrate surface a current of from 50 $A/m^2$ to 150 $A/m^2$ through the aqueous plating solution to an anode.

* * * * *